US006938580B2

United States Patent
Herbst

(10) Patent No.: US 6,938,580 B2
(45) Date of Patent: Sep. 6, 2005

(54) CHOKE COLLAR FOR ANIMALS

(75) Inventor: Hans Joachim Herbst, Iserlohn (DE)

(73) Assignee: Herm. Sprenger GmbH & Co. (DE)

( * ) Notice: Subject to any disclaimer, the term of this patent is extended or adjusted under 35 U.S.C. 154(b) by 0 days.

(21) Appl. No.: 10/363,974

(22) PCT Filed: May 8, 2001

(86) PCT No.: PCT/DE01/01726
§ 371 (c)(1),
(2), (4) Date: Aug. 4, 2003

(87) PCT Pub. No.: WO02/19808
PCT Pub. Date: Mar. 14, 2002

(65) Prior Publication Data
US 2004/0011300 A1 Jan. 22, 2004

(30) Foreign Application Priority Data
Sep. 8, 2000 (DE) .......................................... 100 44 651

(51) Int. Cl.$^7$ ............................................. A01K 27/00
(52) U.S. Cl. ..................................................... 119/864
(58) Field of Search ................................ 119/864, 856, 119/863, 792, 862, 829, 855

(56) References Cited
U.S. PATENT DOCUMENTS

| 205,515 A | * | 7/1878 | Von Culin | 119/862 |
|---|---|---|---|---|
| 2,614,533 A | * | 10/1952 | Elsinger | 119/864 |
| 2,743,702 A | * | 5/1956 | Sullivan | 119/864 |
| 2,859,732 A | * | 11/1958 | Driscoll | 119/864 |
| 3,159,140 A | * | 12/1964 | Miller | 119/719 |
| 4,841,915 A | * | 6/1989 | Rocchetti | 119/864 |
| 4,996,948 A | * | 3/1991 | Klein et al. | 119/864 |
| 5,647,303 A | * | 7/1997 | Deioma | 119/864 |
| 5,676,093 A | * | 10/1997 | Sporn | 119/792 |
| 6,308,663 B1 | * | 10/2001 | Philen et al. | 119/864 |
| 6,481,384 B2 | * | 11/2002 | Jacobs | 119/864 |

* cited by examiner

Primary Examiner—Michael J. Carone
Assistant Examiner—Kimberly S. Smith
(74) Attorney, Agent, or Firm—Akerman Senterfitt

(57) ABSTRACT

A choke collar for animals, including a neck part and a pull chain. The neck part is strand-shaped and is composed of a plurality of chain links having two final links and connecting links. The connecting links include final intermediate connecting links adjacent the two final links. Each of the final links is provided with two eyes for engagement with the final connecting links and with an eyelet. The pull chain forms a closed loop and reaches through the eyelets of the two final links. At least one of the two final links is configured as a plate, which has a first end region and a second end region and is provided, in the first end region, with the eyelet and, in the second end region, with the two eyes for engagement. The second end region is located opposite the first end region.

16 Claims, 3 Drawing Sheets

Figure 1:
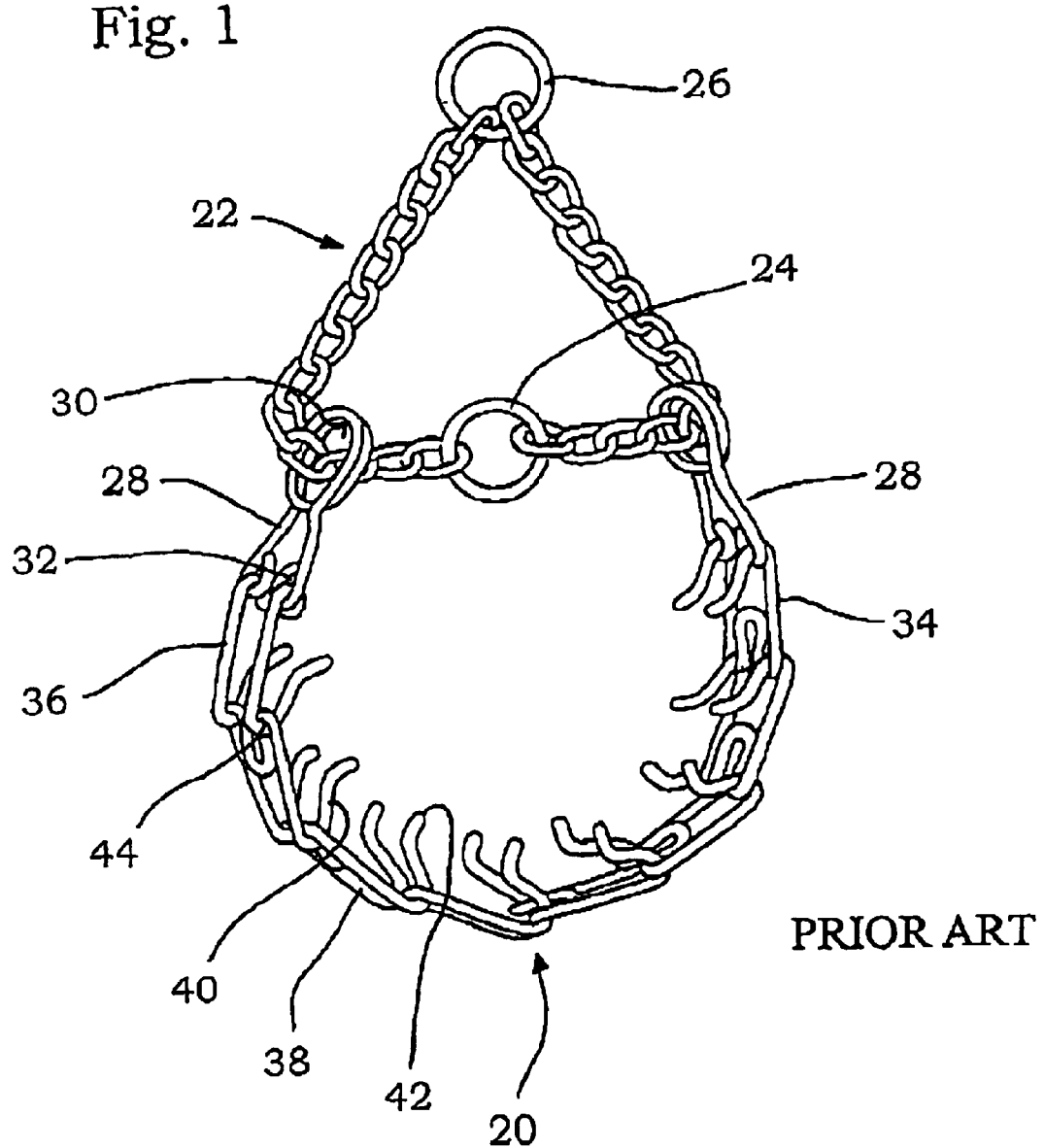

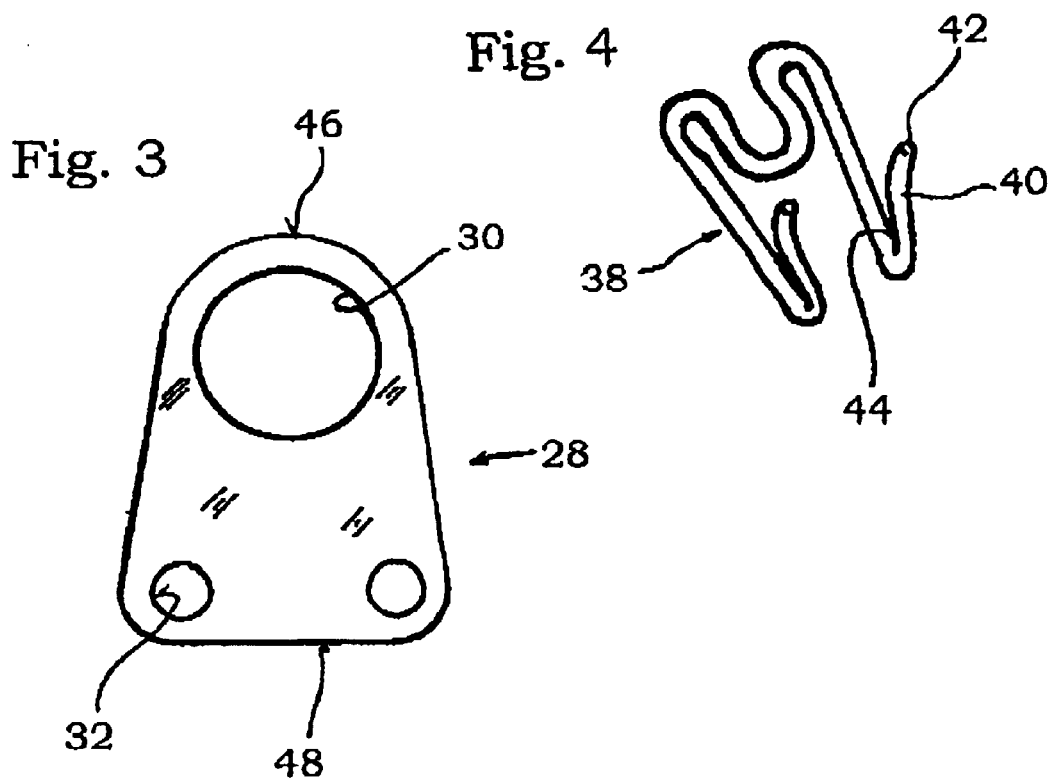
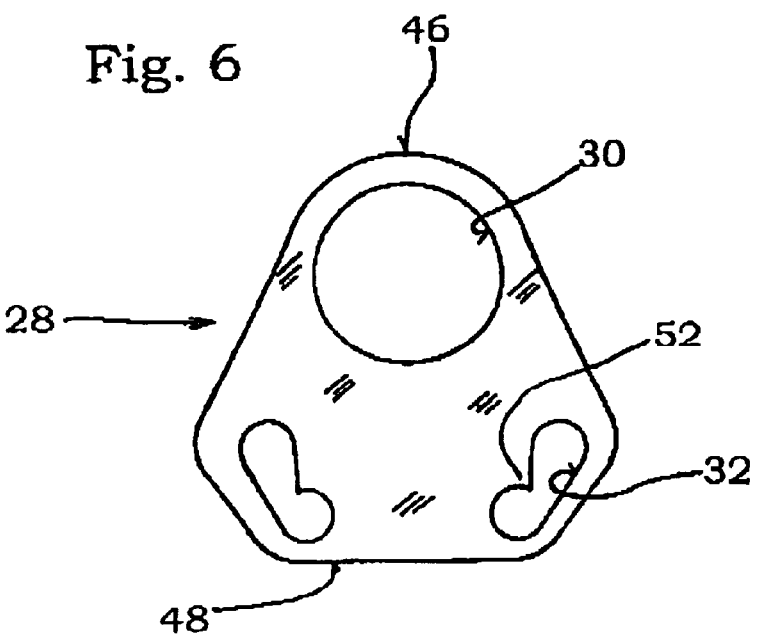

CHOKE COLLAR FOR ANIMALS

The invention relates to a choke collar for animals, for dogs for example, with a strand-shaped neck part and a pull chain, the neck part being composed of a plurality of chain links comprising connecting links and two final links, said final links being each provided with two eyes for engagement with the final connecting links adjacent the two final links and with an eyelet, the pull chain forming a closed loop that reaches through the eyelets of the two final links.

In this choke collar well known in the art, both the final links and the connecting links are made of bent wire. The eyelets are thereby substantially formed by two windings of the wire material used. The eyes for engagement are formed by end regions of the wire blank used to make the final link. These end regions are bent back to form the eyes for engagement, which, as a result thereof, are approximately shaped like droplets. The two final links are built according to the same principle. Each final link meshes a final connecting link. The two final connecting links thereby differ. The final connecting link of the one end region, i.e., the one which is allocated to the one final link, is built according to the same principle as the other connecting links. This is due to the fact that the chain has a preferred direction in which the chain links will mesh and be connected together. In the same way as the other connecting links that are built according to the same principle and will be called intermediate links hereinafter, this first final connecting link has, on its inner side, arms that project toward the neck of the animal, said arms being provided with free ends. These arms originate from a base member of this first final connecting link, which is level. This also applies for all of the other intermediate links. The arms project from this plane of the base member, forming one U-shaped hook region each. These hook regions mesh with the eyes for engagement.

The other, second final connecting link has a different base member. The arms are not different from those of the first final connecting link.

To put the choke collar on an animal, the neck part must be opened. This is achieved by pushing together the arms of the first final connecting link, which are in their position of rest in which they slightly diverge toward their free ends, and by pushing them through the eyes for engagement so that the arms disengage from the eyes.

This however has the following disadvantage: as both the corresponding final link and the first final connecting link are made of bent wire, a permanent deformation of the distance between the two eyes for engagement and/or a similarly permanent deformation of the main piece, which causes the relative spacing between the two hook regions to change, also results in a noticeable change in the quality of the connection between the final link and the first final connecting link. This may even result in the fact that the first final connecting link may be easily unhooked from the final link and that, in any case, the desired spring force of the arms, which is to counteract this unhooking, is no longer strong enough.

Whereas in a brand new, unused choke collar the U-shaped hook regions are each located approximately in the center of the eyes for engagement, in used choke collars the relative spacing between the two arms or the relative spacing between the two eyes for engagement has an increasing tendency to be either increased or reduced, which results in the fact that the central position is no longer given and that it becomes considerably more easy to push the arms out of the eyes for engagement. As already mentioned, this may lead to an unwanted release, that is to say to a disengagement between the final link and the first final connecting link. This is disadvantageous though and is not allowed to occur in practice.

In state of the art collars, the second final connecting link at the other end of the neck part is connected to the corresponding final link in such a manner that it cannot be detached there. This also constitutes a drawback since a user does not always exactly know at which final link he may open the neck part.

In view thereof, it is the object of the invention to develop the choke collar of the type mentioned herein above, to more specifically prevent a final link and the corresponding final connecting link from undesirably disengaging and to make the choke collar more easy to use.

In view of the choke collar of the type mentioned herein above, the solution to this object is to configure at least one of the two final links as a plate that is provided, in a first end region, with the eyelet and, in a second end region located opposite the first end region, with the two eyes for engagement.

In this choke collar, at least one of the two final links is no longer made of bent wire, but is a plate which is shaped like a triangle with a very rounded apex, the shape being very proximate the shape of a rectangle. In a first end region, the plate has the eyelet and in a second end region, which is located opposite said first end region, it has the two eyes for engagement. The relative spacing between the two eyes for engagement is thus fixated. Accordingly, this spacing cannot be altered by any manipulations. As a result thereof, the relative spacing between the two arms of the first final connecting link always remains within a predetermined range. It cannot happen that a user compensates an increased spacing between the two eyes for engagement by accordingly adjusting and increasing the spacing between the two arms, as this is the case with the prior art choke collar. Accordingly, it is no longer possible to have a deviation of one of the two cooperating parts compensated by a similar plastic deformation of the other part, which results in the end in an ever increasing or ever diminishing spacing and in considerable impairment of the functionality. It is precisely because of the fixed spacing between the two eyes for engagement that only the spacing between the two arms of the first final connecting link may and has to be adjusted. This spacing can never get out of the normal range.

Furthermore, the spacing between the two eyes for engagement is also very rigidly kept, the spacing between the arms of the first final connecting link being repeatedly adjusted in such a manner that it remains in the standard range, irrespective of any bending attempt of a user. Since the spacing between the two eyes for engagement is much more rigid than the spacing between the two arms of the first final connecting link, the latter must repeatedly adjust, said adjustment occurring automatically at each hooking and unhooking procedure, irrespective of a bending attempt of a user.

In addition, the plate has considerable aesthetic advantages. It after all permits to carry hints, about the manufacturer for example or of how to use the collar. The plate makes it more easy for the user to open and close the neck part, as the user now immediately sees where he has to open the neck part when he wants to put the choke collar on an animal or take it off. If, with the prior art choke collar, the individual links of the neck part could not be distinguished very clearly, this is now considerably facilitated. As a result thereof, it poses significant user advantages.

In a preferred embodiment of the invention, the two final links are configured as plates, these two final links are preferably built according to the same principle. The advantage thereof is that now the way of hooking is the same for the two final links and a user needs no longer look for the right end region of the neck part as this was the case with the prior art collar.

In a preferred embodiment, the eyelet and the two eyes for engagement are holes, the respective center of which is situated on the angles of an isosceles triangle. The angles of the triangle sides are located in the center of the respective one of the eyes for engagement and have an angular measure of 50 to 70%, preferably of 60%. The plate thus has a nice shape and allows convenient utilization.

In still another preferred embodiment, the plate is limited by pieces in the shape of an arc of a circle that exhibit a course that is concentric with the centers of the eyelets and of the eyes for engagement which are configured as holes. As a result thereof, the plate has a very handy, rounded shape and acts, in the pull direction of the associated and adjacent parts, substantially like a ring.

In a preferred embodiment, all of the connecting links are made of bent wire. As compared to previously known choke collars, it is substantially the final links that are different. The functionality remains unchanged. Accordingly, the inventive chain maintains the user advantages obtained with the prior art collar.

If the two final links are configured as plates, the second final connecting link of the prior art collar can still be used having the same design, but hooking has to be performed in the reverse direction. Its arms are no longer connected to an intermediate link but mesh with the eyes for engagement of the plate, which constitutes the corresponding final link.

In another preferred embodiment, the diameter inside of the round eyes for engagement is slightly larger, more specifically 30 to 120% larger than the diameter of the wire of which the connecting links, more specifically the final connecting links, are made. In this way, the adjustment of the spacing between the arms of the final connecting links as it has been described is achieved over and over again. It may thereby be advantageous to give the eyes for engagement an oval shape, the longitudinal direction of the oval being oriented in the pull direction of the chain. The lateral positioning of the arms is thus improved, and the hooking and unhooking procedures are facilitated.

Figure 2:
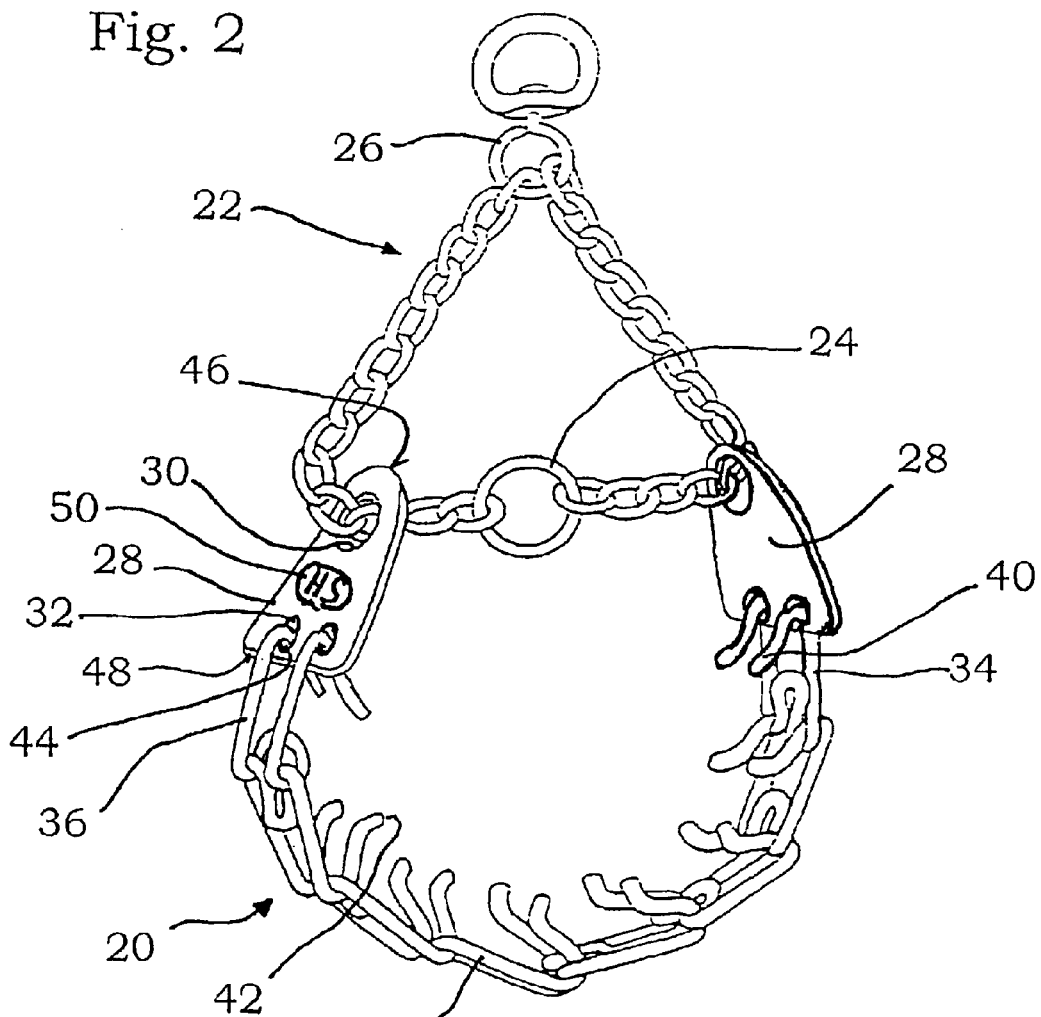
Figure 5:
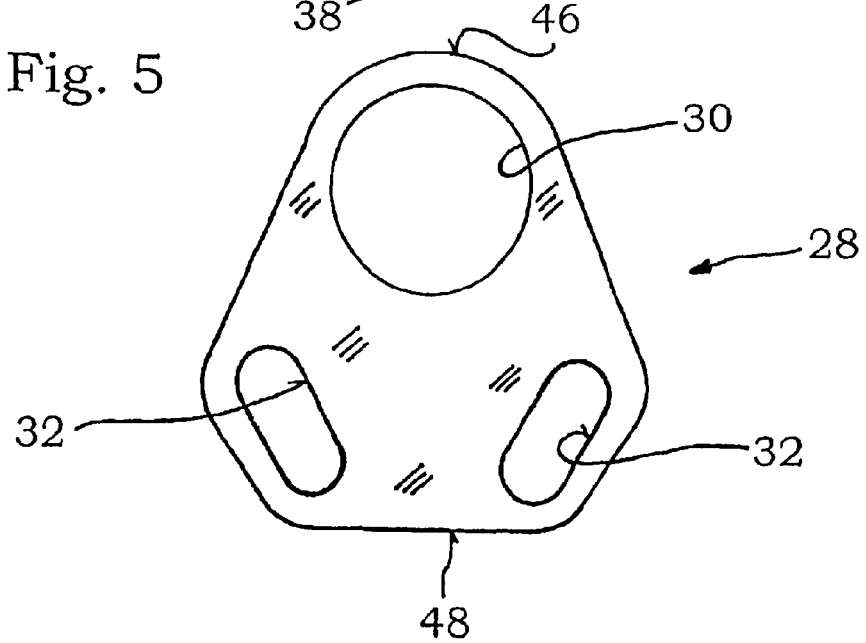

Further advantages and characteristics of the invention will become apparent in the remaining claims and in the following description of an exemplary embodiment of the invention that is not limiting the scope of the invention and that is explained in more detail with reference to the drawing in which:

FIG. 1 is a perspective top view of a choke collar according to the state of the art, FIG. 2 is a perspective view in the direction of sight in FIG. 1 of a choke collar in accordance with the invention, FIG. 3 is a top view of a plate constituting a final link, FIG. 4 is a perspective view of an intermediate link as it is utilized for the neck part according to the FIGS. 1 and 2, FIG. 5 is a top view similar to FIG. 3 of another embodiment of a plate constituting the part of engagement and FIG. 6 an illustration as in FIG. 5, but with the plate being configured in another way.

As shown in FIG. 1, the previously known choke collar has a neck part 20 and a pull chain 22. The latter forms a closed loop that not even the user is capable of opening. By contrast, the neck part 20 is a strand of chain links that may and must be opened in order to put the choke collar on an animal.

As can be surveyed from FIG. 1, the pull chain has an inner ring 24 and an outer ring 26 that are joined together by way of chain strands of the same length. The pull chain closes the neck part so as to form a closed loop.

The neck part is terminated at either end by final links 28 that are built according to the same principle. They are made of bent wire and form an eyelet 30 which s realized by almost two windings of the wire material used. A respective part of the pull chain 22 is passed therethrough. The eyelets 30 are dimensioned in such a manner that the two rings 24 and as 26, and in any case the inner ring 24, cannot pass through the eyelets 30.

Furthermore, each final link 28 has two wire regions with free ends pointing toward the other chain links of the neck part 20. The free ends are thereby bent backward to form the two eyes for engagement 32. The section thereof has approximately the shape of a droplet.

Connecting links of the neck part 20 are located between the final links 28. The connecting links that are immediately adjacent the respective one of the final links 28 are termed final connecting links, the right final connecting link in FIG. 1 is called the first final connecting link 34. The final connecting link that is allocated to the left final link in FIG. 1 is termed the second final connecting link 36. As can be surveyed from FIG. 1, these final connecting links 34, 36 are not built according to the same principle. The first final connecting link is rather built according to the same principle as the other connecting links, which are called intermediate links 38. These links are illustrated in FIG. 4 which is a perspective view of such an intermediate link 38, which also squares with the first final connecting link 34. The choke collar in accordance with FIG. 1 has six intermediate links 38. The number of intermediate links is optional as the intermediate links may be released from their connection in the chain. The length of the neck part 20 may thus be varied by inserting or removing intermediate links 38.

As shown in particular in FIG. 4, the first final connecting link 34 and the intermediate links 38 each consist of a base member, which is located in one plane and is shaped like a W, and of two arms 40, which are provided with free ends 42. These arms 40 protrude from the plane, they in turn are located in an arm plane that is oriented at an angle of approximately 30% relative to the plane. The arms 40 are thereby bent backward in such a manner that U-shaped hook regions are formed that act like hooks. The arms 40 are bent toward the free end thereof while being rounded toward the top, and moreover, the free arms are pointing in diverging directions so that the spacing between the arms 40 increases toward the free ends 42 thereof.

The second final connecting link 36 has just the same shaped arms 40 with free ends 42 and U-shaped hook regions 44 as the intermediate links 38 and the first final connecting link 34 respectively. It differs from the latter though in that the center region is now no longer shaped like a "W" but also forms a book that passes through the two eyes 32 for engagement 20 of the corresponding final link 28. There, the final link 28 and the corresponding final connecting link 36 cannot be immediately disengaged; before it can be disengaged the corresponding final link 28, the second final connecting link 36 must first be disengaged from the other neighboring link. As a result thereof, it is isolated. Accordingly, a user will not carry out such a disengagement but will rather only separate the first final connecting link 34 from the corresponding final link 28. The neck part 20 can be opened between the intermediate links 38.

As shown in FIG. 2, the final links 28 are still built according to the same principle, but are now configured as plates. FIG. 3 is a top view of such a plate. The plates have the same surface as the other parts of the chain, i.e., they are nickel-plated, chromium-plated or treated accordingly. But they may also be of another realization in order to make them better recognizable and to better mark the site at which the neck part 20 is to be disengaged.

As can be surveyed from the FIGS. 2 and 3, the plate-shaped final links 28 are somewhat shorter than the other chain links. Whereas the length of the intermediate links 38 and of the other chain links is slightly in excess of 40 mm, the overall length of the final links 28 configured as plates is slightly less than 30 mm. Accordingly, the effective length the final links 28 contribute to the length of the neck part 40 and, as a result thereof, to the closed loop that is put around the neck of an animal, is smaller.

As can be surveyed from the Figs., the external contour of the plate-shaped final links 28 is substantially rectangular, the contour may also be described by an isosceles triangle that is extremely rounded at its very acute angle.

The plate-shaped final links 28 have a first end region 46 where they are very rounded and where there is provided the circular eyelet 30 whose inside diameter is approximately 14 mm. A free inside diameter may be selected here, said diameter corresponding to the inside diameter of the eyelet 30 according to the state of the art (FIG. 1). Advantageously however, the inside diameter is chosen to be slightly smaller, so that it largely suffices to thread the respective part of the pull chain 22 therethrough. This is the case in the exemplary embodiment shown; comparing the FIGS. 1 and 2, it can be seen that the inside diameter of the eyelets 30 is considerably smaller in FIG. 2.

In the first end region 46, the plate-shaped final link 28 is bounded by an arc of a circle extending almost 180 degrees and being centered on the center of the eyelet 30. The material thickness in the longitudinal direction of the chain is approximately 2–4 mm. As a result thereof, the first end region acts almost as a ring in the direction of pull of the chain, it actually represents a half ring.

The second end region 48 is oriented straight in the exemplary embodiment shown, the two eyes for engagement 32 are located at the corner points thereof, the inside dimensions of said eyes being, like in the prior art collar, considerably smaller than those of the eyelet 30. But here, the eyes for engagement 32 are round. Whereas the diameter of the wire material out of which the intermediate links are made, ranges between 2 and 3 mm, the side diameter of the eyes for engagement ranges between 4 and 5 mm and is accordingly twice the size thereof.

Between the two end regions 46, 48 there remains a field 50 that can accommodate useful hints, firm names, and so on. Such a field 50 was neither possible nor provided in the prior art collar.

As can be surveyed from FIG. 3, the borders of the plates exhibit a course that is concentric with the center of the respective one of the eyes for engagement 32 also in the region of the two eyes for engagement 32, so that here too ring-like conditions are obtained. The curve extends for slightly more than 90 degrees. For the rest, the boundaries of the plates are straight lines.

As contrasted with prior art, the cooperation of the plate-shaped final links 28 of the neck part 20 with the allocated final connecting links 34, 36 is realized in the same way. To achieve this goal, a piece is used as second final connecting link 36 which is built according to the same principle as the second final connecting link according to prior art, but in this case, said final connecting link is used in the other direction within the chain. As a result thereof, its arms do not cooperate with the corresponding intermediate link 38, but with the eyes for engagement 32.

FIG. 5 shows a modified realization of the plate constituting the two final links 28 that are built according to the same principle. Hereinafter, we shall only describe the differences between this realization and the embodiment shown in FIG. 3. Now, the two eyes for engagement are no longer circular holes, but long holes that are oriented at an oblique angle of e.g., 30 degrees to the pull direction of the chain. At their lower end, which is located at the greatest distance from the eyelet 30, these eyes for engagement are separated by a distance that equals that of the plate of FIG. 3. At their upper end however, the relative spacing equals the spacing between the free ends 42 of the respective one of the corresponding final connecting links 34 and 36. As a result thereof, said final connecting link can be inserted directly at the upper end regions of the eyes for engagement 32, without the arms 40 having to be bent. It then glides downward in the pull direction of the chain. The U-shaped hook regions 44 then abut on the lower rim of the eyes for engagement 32 in just the same way as in the embodiment in accordance with FIG. 3.

The embodiment of FIG. 6 largely corresponds to that of FIG. 5, only that now, it is more difficult for the hook regions 44 to travel back. Now, the long holes have no longer the same width along their entire length, but are provided with a narrow portion 52. Said narrow portion has the shape of a saw tooth. The hook regions 44 must glide past this narrow portion 52. On closing the collar, they glide from the top to the bottom past the narrow portion 52, which is promoted by the saw tooth shape of the narrow portion 52. On the return motion as it is to be executed to undo it, the hook regions 44 knock against the narrow portion 52, which impairs disengagement.

It is also possible to insert other stops into the eyes for engagement configured as long holes in embodiments similar to those shown in the FIGS. 5 and 6. Between the two end positions, spring tongues as they are known to be used in trigger snaps may be provided for example, or arms, which are spring loaded and completely block the return motion, may be articulated to the plate.

What is claimed is:

1. A choke collar for animals comprising:
   a neck part; and
   a pull chain,
   the neck part being composed of a plurality of chain links including two final links and connecting links,
   said connecting links including final connecting links adjacent the two final links, each of said final links being provided with two eyes for engagement with the final connecting links and with an eyelet,
   means for opening the neck part between each final link and the adjacent final connecting link, each of said final connecting links having two arms, said two arms having free ends, the two arms being detachably insertable in the eyes of the final links,
   wherein the pull chain forms a closed loop reaching through the eyelets of the two final links, and
   wherein at least one of the two final links is configured as a plate having a solid central area, said plate having a first end region and a second end region and being provided, in the first end region, with the eyelet and, in the second end region, with the two eyes for engagement, said second end region being located opposite the first end region.

2. The choke collar of claim 1, wherein the eyelet and the two eyes for engagement are configured as holes in the plate, the respective center of said holes being situated on the angles of an isosceles triangle.

3. The choke collar of claim 1, wherein the two final links are configured as plates, wherein the two final connecting links, which are associated with said plates, have a different shape and have arms with free ends that project inward, wherein the arms of the two final connecting links mesh with the eyes for engagement of the neighboring plate.

4. The choice collar of claim 2, wherein the holes have centers and the place is delimited by lines following an are of a circle which lines are concentric to the neighboring centers.

5. The choke collar of claim 1, wherein the two final links are configured as plates.

6. The choke collar of claim 1, where the connecting links including the final connecting links are made of bent wire.

7. The choke collar of claim 4, wherein the diameter of the eyes for engagement is slightly larger than the diameter of a wire used a make said connecting links.

8. The choke collar of claim 1, where the connecting links have arms, which arms have free ends projecting inwardly.

9. The choke collar of claim 1, wherein the arms converge in a "V" shape and are increasingly diverging toward their free ends.

10. The choke collar of claim 1, wherein the place is level and the material thickness thereof ranges between 1 and 4 mm.

11. The choke collar of claim 1, wherein the plate constitutes a surface for carrying information.

12. The choke collar of claim 1, wherein the length of the at least one final link configured as a plate is smaller than the length of the connecting links.

13. The choke collar of claim 12, wherein the length of the at least one final link configured as a plate is between 50 and 80% of the length of the connecting links.

14. The choke collar of claim 1, wherein the animals are dogs.

15. The choke collar of claim 4, wherein the diameter of the eyes for engagement is 30 to 120% larger than the diameter of a wire used to make said connecting links.

16. The choke collar of claim 1, wherein the plate is level and the material thickness of the plate amounts to 2 mm.

* * * * *